(12) United States Patent
Cohen et al.

(10) Patent No.: US 7,487,142 B2
(45) Date of Patent: Feb. 3, 2009

(54) METHODS AND APPARATUS FOR SPECIFYING AND PROCESSING DESCRIPTIVE QUERIES FOR DATA SOURCES

(75) Inventors: Norman Howard Cohen, Suffern, NY (US); Paul C. Castro, White Plains, NY (US); Archan Misra, Irvington, NY (US)

(73) Assignee: International Business Machines Corporation, Armonk, NY (US)

( * ) Notice: Subject to any disclaimer, the term of this patent is extended or adjusted under 35 U.S.C. 154(b) by 577 days.

(21) Appl. No.: 10/865,058

(22) Filed: Jun. 10, 2004

(65) Prior Publication Data

US 2005/0278285 A1 Dec. 15, 2005

(51) Int. Cl.
*G06F 7/00* (2006.01)

(52) U.S. Cl. .................. 707/3; 707/2; 707/4; 707/5; 707/6; 707/100

(58) Field of Classification Search .............. 707/1, 707/3–6, 10, 101, 104.1; 705/10, 14, 1; 715/500, 715/513; 709/218
See application file for complete search history.

(56) References Cited

U.S. PATENT DOCUMENTS

| | | | |
|---|---|---|---|
| 6,085,188 A | 7/2000 | Bachmann et al. | |
| 6,275,957 B1 | 8/2001 | Novik et al. | |
| 6,282,537 B1 | 8/2001 | Madnick et al. | |
| 6,327,574 B1* | 12/2001 | Kramer et al. | 705/14 |
| 6,498,795 B1 | 12/2002 | Zhang et al. | |
| 6,560,591 B1 | 5/2003 | Memmott et al. | |
| 6,604,127 B2 | 8/2003 | Murphy et al. | |
| 7,209,915 B1* | 4/2007 | Taboada et al. | 707/3 |
| 2002/0044571 A1* | 4/2002 | Penet | 370/506 |
| 2002/0092000 A1 | 7/2002 | Srinivasan et al. | |
| 2002/0103693 A1* | 8/2002 | Bayer et al. | 705/10 |
| 2002/0112028 A1* | 8/2002 | Colwill, Jr. | 709/218 |
| 2002/0116202 A1* | 8/2002 | Bantz et al. | 705/1 |
| 2002/0174222 A1* | 11/2002 | Cox | 709/224 |
| 2003/0101170 A1 | 5/2003 | Edelstein et al. | |
| 2003/0126120 A1* | 7/2003 | Faybishenko et al. | 707/3 |
| 2003/0154305 A1 | 8/2003 | Bethmangalkar et al. | |
| 2003/0236859 A1* | 12/2003 | Vaschillo et al. | 709/218 |
| 2004/0002939 A1* | 1/2004 | Arora et al. | 707/1 |
| 2004/0015783 A1* | 1/2004 | Lennon et al. | 715/523 |

(Continued)

OTHER PUBLICATIONS

W. Adjie-Winoto et al., "The Design and Implementation of an Intentional Naming System," 17th ACM Symposium on Operating Systems Principles (SOSP), pp. 186-201, Dec. 1999.

(Continued)

*Primary Examiner*—Apu Mofiz
*Assistant Examiner*—Jessica N Le
(74) *Attorney, Agent, or Firm*—Anne V. Dougherty; Ryan, Mason & Lewis, LLP

(57) ABSTRACT

Improved descriptive query techniques are provided. More particularly, techniques are provided for specifying and processing descriptive queries for data providers grouped into provider kinds with hierarchical containment relationships. The query may include arbitrary boolean combinations of arbitrary tests on the values of attributes of the data providers.

22 Claims, 13 Drawing Sheets

U.S. PATENT DOCUMENTS

2004/0186776 A1* 9/2004 Llach .......................... 705/14
2005/0004892 A1* 1/2005 Brundage et al. .............. 707/3
2005/0138003 A1* 6/2005 Glover et al. ................. 707/3

OTHER PUBLICATIONS

M. Balazinska et al., "INS/Twine: A Scalable Peer-to-Peer Architecture for Intentional Resource Discovery," International Conference on Pervasive Computing (Pervasive 2002), 16 pages, Aug. 2002.

T. Berners-Lee et al., "The Semantic Web," Scientific American 284, No. 5, pp. 1-6, May 2001.

E. Christensen et al., Web Services Description Language (WSDL) 1.1, W3C Note, www.w3.org/TR/wsdl, pp. 1-51, Mar. 2001.

S.E. Czerwinski et al., "An Architecture for a Secure Service Discovery Service," Mobicom '99, pp. 1-12, 1999.

E. Guttman, et al., "Service Location Protocol," Network Working Group Request for Comments, Version 2, IETF RFC 2608, www.ietf.org/rfc/rfc2608/.txt, pp. 1-54, Jun. 1999.

J. Heidemann et al., "Building Efficient Wireless Sensor Networks with Low-Level Naming," Proceedings of the 18th ACM Symposium on Operating Systems, (SOSP), 14 pages, Oct. 2001.

Sun Microsystsems, Jini™ Technology Core Platform Specification, Version 2.0, http://wwws.sun.com/software/jini/specs, pp. 1-152, Jun. 2003.

M. Wahl et al., "Lightweight Directory Access Protocol (v3)," Network Working Group Request for Comments, IETF RFC 2251, www.ietf.org/rfc/rfc2251/.txt, pp. 1-50, Dec. 1997.

* cited by examiner

METHODS AND APPARATUS FOR SPECIFYING AND PROCESSING DESCRIPTIVE QUERIES FOR DATA SOURCES

FIELD OF THE INVENTION

The present invention relates to descriptive query techniques and, more particularly, to techniques for specifying and processing descriptive queries for data providers grouped into provider kinds with hierarchical containment relationships.

BACKGROUND OF THE INVENTION

A number of systems are designed to obtain services from network resources such as sensors, cameras, printers, and web services. These resources may be mobile, they may be ephemeral, and their quality of service may fluctuate. It has become widely accepted that such systems should not require users to name a specific resource from which they wish to obtain services, but rather, to describe what the resource is expected to provide, so that the system can discover an appropriate resource. This approach, known as descriptive naming, allows the system to select the best available resource, based on current conditions, and it makes an application robust against the failure of any one device. The approach accommodates the frequent addition of resources to, or removal of resources from, the system, without modification of the application that uses such resources. The approach also allows an application written for one environment to be ported easily to another environment with a different set of resources.

A number of approaches have been taken to describe what a resource is expected to provide. Many of the approaches feature queries based on a flat structure of categories, with each resource residing in precisely one category. More powerful approaches support a hierarchy of categories, in which all resources in a category C can be used in any context in which a resource in a category above C in the hierarchy can be used. A query for resources in a category above C can be satisfied not only by resources of that category, but also by resources of category C.

Many approaches allow queries to test attributes of resources, but restrict the kinds of tests that can be performed, or the ways in which tests of different attributes can be combined. An approach that only allows a conjunction of attribute-equality tests is inadequate for determining whether a resource with attributes giving the x and y coordinates of a point corresponds to a point inside a given rectangle. If ordering comparisons as well as equality tests are allowed, it is possible to query for placement within a given rectangle, but not for placement inside any of a set of rectangles.

Ontology-based query systems support unstructured queries, in particular natural-language queries, and apply common-sense reasoning to deduce facts that are not explicitly represented in the data sources being queried. Such systems may return an answer to some question different from the question that was posed to it, if the system deduces that the answer reflects the questioner's intent. Development of ontologies is labor-intensive, so few exist yet, and it is not clear that resources will exist in the long run to maintain them. Furthermore, for applications that expect precise answers to precisely posed questions, returning an approximate answer, or an answer to a closely related question, is unacceptable.

SUMMARY OF THE INVENTION

Principles of the present invention provide improved descriptive query techniques. More particularly, techniques are provided for specifying and processing descriptive queries for data providers grouped into provider kinds with hierarchical containment relationships. The query may include arbitrary boolean combinations of arbitrary tests on the values of attributes of the data providers.

In one aspect of the invention, a technique for processing descriptive queries for data sources includes the following steps/operations. Given is a set of named data providers, each distinguished by a type of data the data provider provides and a set of attributes each with a unique name and a particular type of value, and a grouping of the data providers into named provider kinds, such that data providers grouped into the same provider kind provide the same type of data and have the same set of attributes. A descriptive query is obtained. The descriptive query includes the name of a provider kind and a specification of a mapping from an assignment of one or more values for one or more attributes of the data provider to one of a true value and a false value. The descriptive query is resolved. The resolving step/operation includes obtaining the names of data providers in the set of named data providers that belong to the provider kind specified in the descriptive query and for which the mapping specified in the descriptive query maps the one or more values of the one or more attributes of the data provider to the true value.

The mapping specification may be a boolean-valued expression in which the names of the attributes of a data provider may appear, representing the assigned values of the attributes. The boolean-valued expression may be an XQuery expression evaluated in the context of an XML document that specifies the values of the attributes of the data provider.

Each data provider may have a set of uniquely named activation parameters, each of a specified type. Data providers grouped into the same provider kind may have activation parameters with the same set of names, with identically named activation parameters of different data providers of the same provider kind having the same type. The descriptive query may include an assignment of values to activation parameters, with the value assigned to an activation parameter being of the type of that activation parameter. For a query that includes activation parameters, the resolving step/operation includes obtaining the names of data providers in the set of named data providers, activated with the assignment of activation parameter values in the descriptive query, that belong to the provider kind specified in the descriptive query and for which the mapping specified in the descriptive query maps the values of the attributes of the data provider to the true value.

The descriptive query may further include the specification of a selection mechanism for selecting a subset of a set of data providers. For a query that includes a selection mechanism, the resolving step/operation includes obtaining the names of data providers in the subset selected by the selection mechanism specified in the descriptive query from the set of data providers in the set of named data providers that belong to the provider kind specified in the descriptive query and for which the mapping specified in the descriptive query maps the values of the attributes of the data provider to the true value.

The selection mechanism may select one arbitrary member of a set or all members of a set. Alternatively, the specification of a selection mechanism may include the specification of a mapping from an assignment of values for attributes of a data provider to a numeric value and the specification of a mechanism for selecting a subset of a set of data providers given the numeric value to which the mapping maps the attribute values of each data provider in the set. The specification of a mapping from an assignment of values for attributes of a data provider to a numeric value may be a number-valued expression in which the names of the attributes of a data provider may appear, representing the assigned values of the attributes. The number-valued expression may be an XQuery expression evaluated in the context of an XML document that specifies the values of the attributes of the data provider.

The specification of a mechanism for selecting a subset of a set of data providers given the numeric value may include, for example, any of the following:

selecting all data providers with numeric values above a given threshold;
 selecting the N data providers with the highest numeric values for a specified value of N;
 selecting the first N data providers found regardless of their numeric values for a specified value of N;
 selecting all data providers found within a time interval T regardless of their numeric values.

Provider kinds may be designated as subkinds of other provider kinds, a first provider kind being eligible to be designated as a subkind of a second provider kind if the type of the data provided by the first provider kind is a subtype of the type of the data provided by the second provider kind. Given such a designation, the resolving step/operation may include obtaining the names of data providers in the set of named data providers that belong to the provider kind specified in the descriptive query, or to any subkind of the provider kind, and for which the mapping specified in the descriptive query maps the values of the attributes of the data provider to the true value.

Provider kinds associated with sets of activation parameters may be designated as subkinds of other such provider kinds, a first provider kind being eligible to be designated as a subkind of a second provider kind if: (i) the type of the data provided by the first provider kind is a subtype of the type of the data provided by the second provider kind; (ii) the set of activation-parameter names of the first provider kind is a subset of the set of activation parameter names of the second provider kind; and (iii) the type of each activation parameter of the first provider kind is a supertype of the type of the identically named activation parameter of the second kind. Given such a designation, the resolving step/operation may include obtaining the names of data providers in the set of named data providers that belong to the provider kind specified in the descriptive query, or to any subkind of the provider kind, and for which the mapping specified in the descriptive query maps the values of the attributes of the data provider to the true value.

A data provider may include the application of a stream transformer to a stream of data provided by one or more other data providers. The technique may further include providing a set of synthesis rules. The synthesis rules contain templates for the specification of provider kinds, in which one or more entities are replaced by one or more template-parameter symbols; substitution of template-parameter values for the template-parameter symbols in a template results in an instance of the template, uniquely specifying a provider kind. A synthesis rule asserts that an instance of a specified template may be synthesized by applying a specified stream transformer to the stream of data provided by the instances of one or more specified templates, provided that the instances are obtained by replacing all occurrences a given template-parameter symbol in the rule with the same template-parameter value. Given such a set of synthesis rules, the resolving step/operation may include obtaining the names of data providers, either belonging to the set of named data providers or synthesized in accordance with the set of synthesis rules, that belong to the provider kind specified in the descriptive query and for which the mapping specified in the descriptive query maps the values of the attributes of the data provider to the true value.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
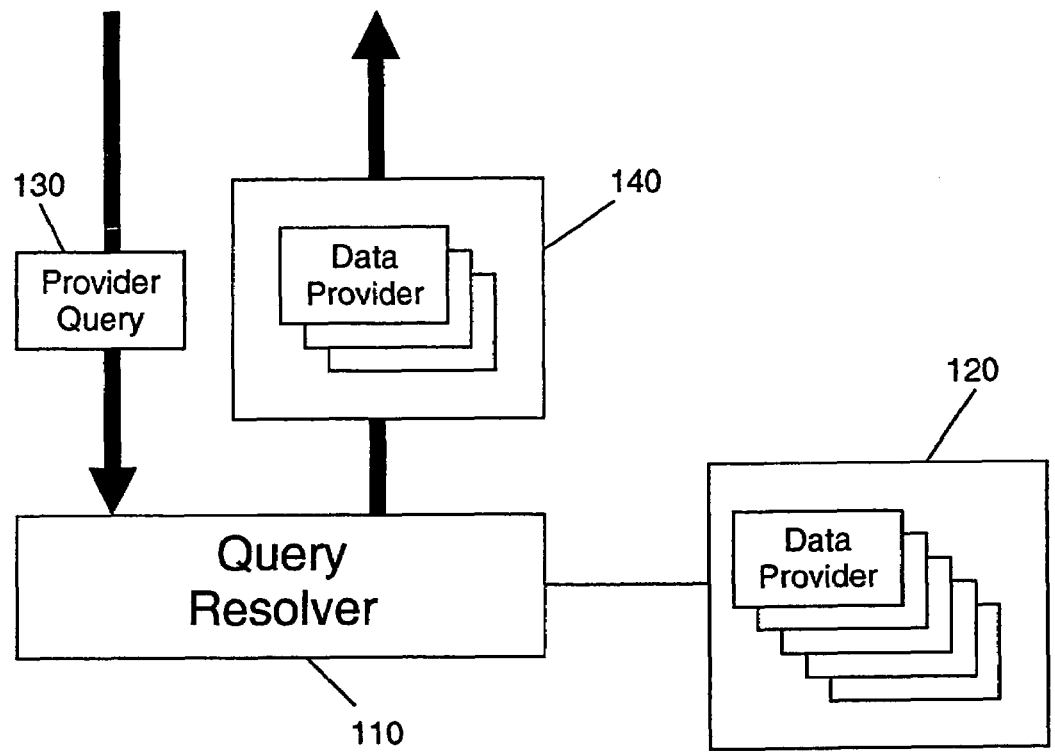
FIG. 1 is a block diagram illustrating a query resolution system, according to an embodiment of the present invention.

It is to be understood that while the present invention will be described below in the context of a distributed computing network, the invention is not so limited. Rather, the invention is more generally applicable to any computing environment in which it would be desirable to provide improved techniques for specifying and processing descriptive queries.

Advantageously, as will be illustratively described below in detail, one aspect of the invention is based on a hierarchy of categories called provider kinds. Data providers belonging to the same provider kind provide the same type of data, with the same underlying semantics, have the same attributes, and are activated using the same types of parameters. By way of example only, a provider kind may include: data providers that give the temperature in degrees Celsius at a specified latitude and longitude; data providers that give the price in dollars of a stock with a specified symbol; and/or data providers that give the price in dollars of IBM stock. Of course, it is to be understood that the invention is not intended to be limited to any particular provider kinds.

The hierarchy is defined in such a way that all data providers of provider kind K can be used in any context in which a data provider with a provider kind above K in the hierarchy can be used. A provider query for a data provider of a kind above K in the hierarchy can be satisfied not only by data providers of that provider kind, but also by data providers of kind K. This hierarchical relationship increases the number of data providers, among those known to a query resolution system (also referred to herein as a "query resolver"), that can match a given query.

Provider queries may also contain arbitrary boolean combinations of arbitrary tests on attributes. In an illustrative embodiment, the attributes of a data provider are reported in an Extensible Markup Language (XML) document, and attributes may be tested by evaluating a boolean-valued XQuery expression in the context of that document. This capability increases the expressiveness of provider queries, allowing application writers to write provider queries that are neither too narrow, eliminating some data providers that would have been acceptable, nor too broad, requiring the application to filter out some data providers returned by a query resolver.

The hierarchy of provider kinds can be viewed as a kind of primordial ontology, with less ambitious and therefore more attainable goals. We seek to classify only data providers rather than arbitrary knowledge, and we do so in a highly constrained manner. We thus avoid the pitfalls of an ontology-based approach.

A second aspect of the invention involves replacing the names of provider kinds in queries, with no analyzable characteristics other than their hierarchical relationship, with provider-kind definitions specifying semantic aspects of provider kinds. Templates for provider-kind definitions, i.e., patterns in which certain defining characteristics of a provider kind are replaced by match variables, occur in synthesis rules of a query resolver.

A synthesis rule asserts that a data provider whose provider-kind is defined by an instance of a particular template can be constructed by applying a specified stream transformation to data providers whose provider kinds are corresponding instances of other particular templates. For example, one template in a synthesis rule could correspond to a provider kind defined to report a result of some sort (the sort corresponding to match parameters) in inches, and another template in the same synthesis rule could correspond to a provider kind reporting the same sort of result in centimeters. The synthesis rule would assert that a data provider whose provider kind is an instance of the second template can be constructed by taking the output of a data provider whose provider kind is an instance of the first template, and multiplying by 2.54. For example, a data provider for measuring plant growth in centimeters can be constructed by taking the output of a data provider for measuring plant growth in inches and multiplying the result by 2.54. A small set of stream transformations and synthesis rules greatly multiplies the number of data providers that can be discovered by a query resolver.

FIG. 1 illustrates the context in which a query resolver (query resolution system) operates. A query resolver 110 has access to a set of data providers 120. A provider query 130 is issued to the query resolver, which responds with a subset 140 of the data providers.

Figure 2:
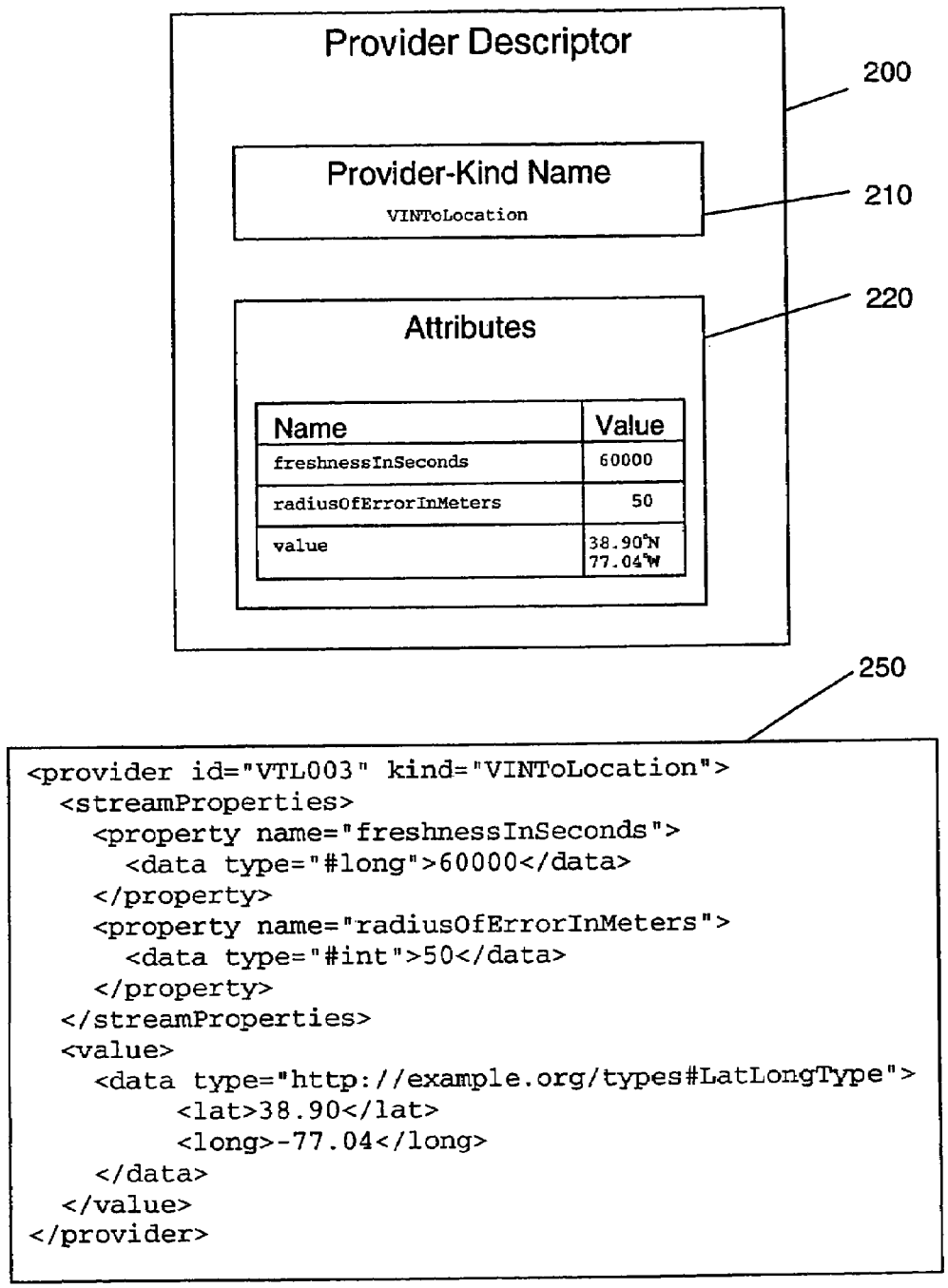
FIG. 2 is a diagram illustrating a provider descriptor, according to an embodiment of the present invention.

Every data provider has a provider descriptor, such as that illustrated in FIG. 2. A provider descriptor 200 has a provider-kind name 210 and a set 220 of attributes, each with a distinct name and a value of some type. A provider query is, essentially, a test that a given provider descriptor either passes or fails. In an illustrative embodiment, a provider query is represented as an XML document 250.

Figure 3:
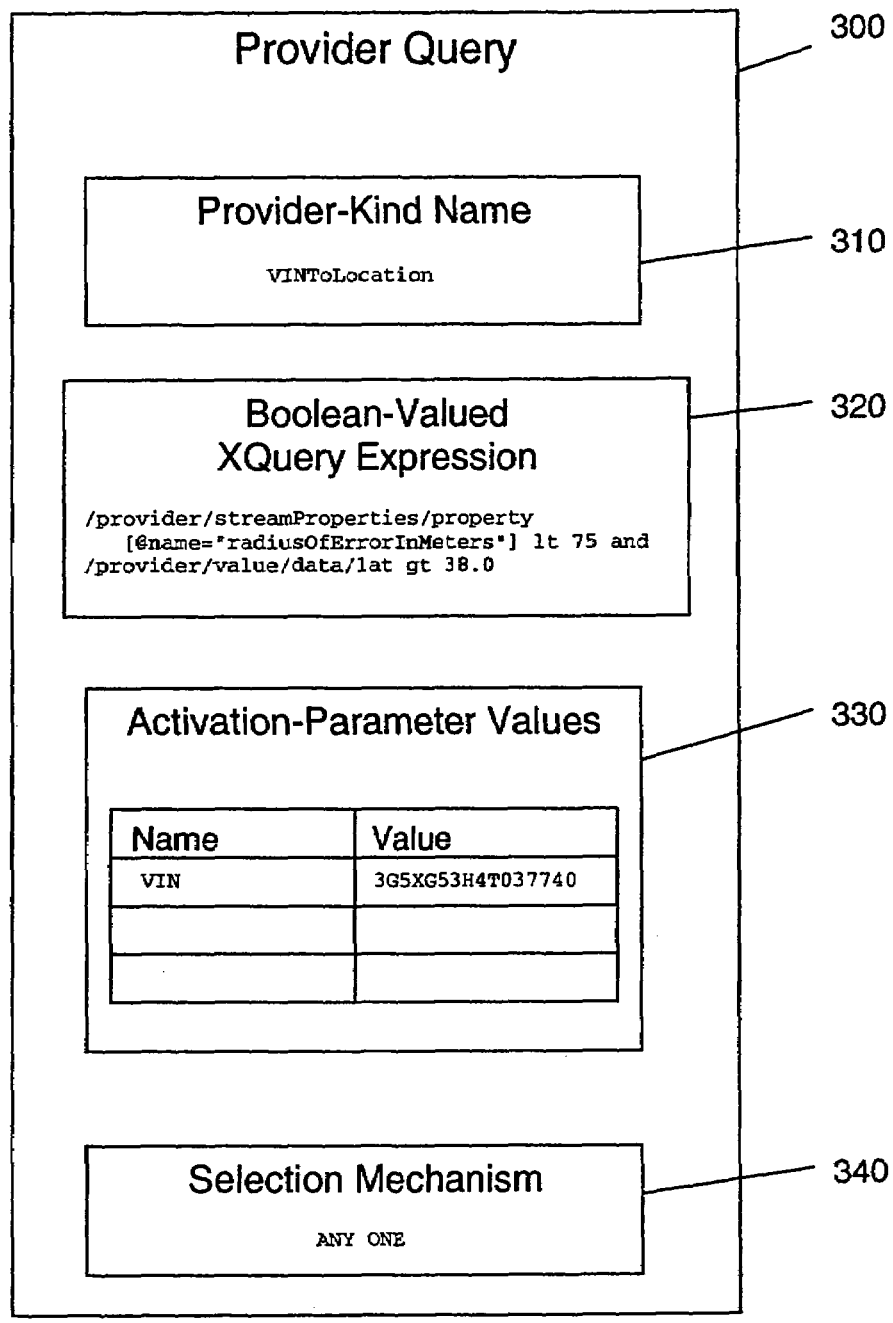
FIG. 3 is a diagram illustrating a provider query, according to an embodiment of the present invention.

In an illustrative embodiment, the provider query 130 has the form illustrated in FIG. 3. A provider query 300 includes the name 310 of a provider kind, a boolean-valued XQuery expression 320, an assignment 330 of activation parameters to parameter values, and a selection mechanism 340. The following paragraphs discuss activation parameters, provider kinds, and selection mechanisms in greater detail.

Activation parameters provide the information needed to activate a data provider. Activation parameters might include, for example, the unique identifier of a particular real-world entity about which data is to be collected, or an authentication token.

Every data provider has a provider kind. All providers of a particular provider kind provide values of the same type, have activation parameters with the same names and types, and have provider descriptors that name the particular provider kind, and have attributes with the same names and types of values.

Figure 4:
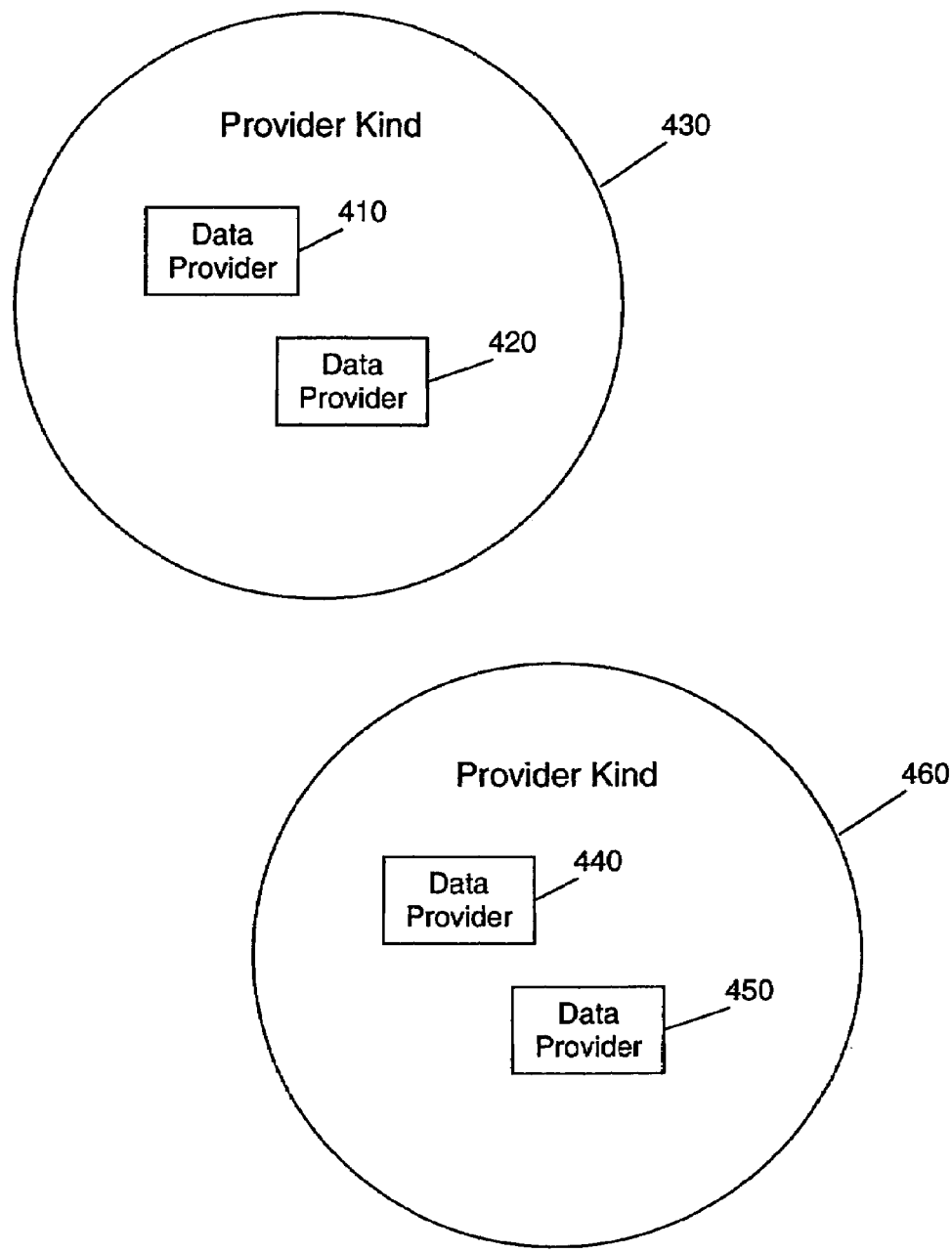
FIG. 4 is a diagram illustrating provider kinds and their relationship to data providers, according to an embodiment of the present invention.

FIG. 4 illustrates data providers 410 and 420 having provider kind 430 and data providers 440 and 450 having provider kind 460. Provider kinds can be organized into hierarchies of superkinds and subkinds, such that a provider of some kind k can serve as a provider of any superkind of k (or, equivalently, that a query for a provider of kind k can be satisfied by a provider of any subkind of k). A provider kind p can be the direct parent of a provider kind c only if each of the following conditions holds:

The type of value provided by c is a subtype of the type of value provided by p.

For each activation parameter of kind c, kind p has an identically named activation parameter, and the type of each parameter of c is a supertype of the type of the corresponding parameter of p.

The set of attribute names of c is a superset of the set of attribute names of p, and attributes with the same name have the same type.

The superkinds of a provider kind k include k and the direct parents of all superkinds of k; if x is a superkind of y, then y is a subkind of x.

Figure 5:
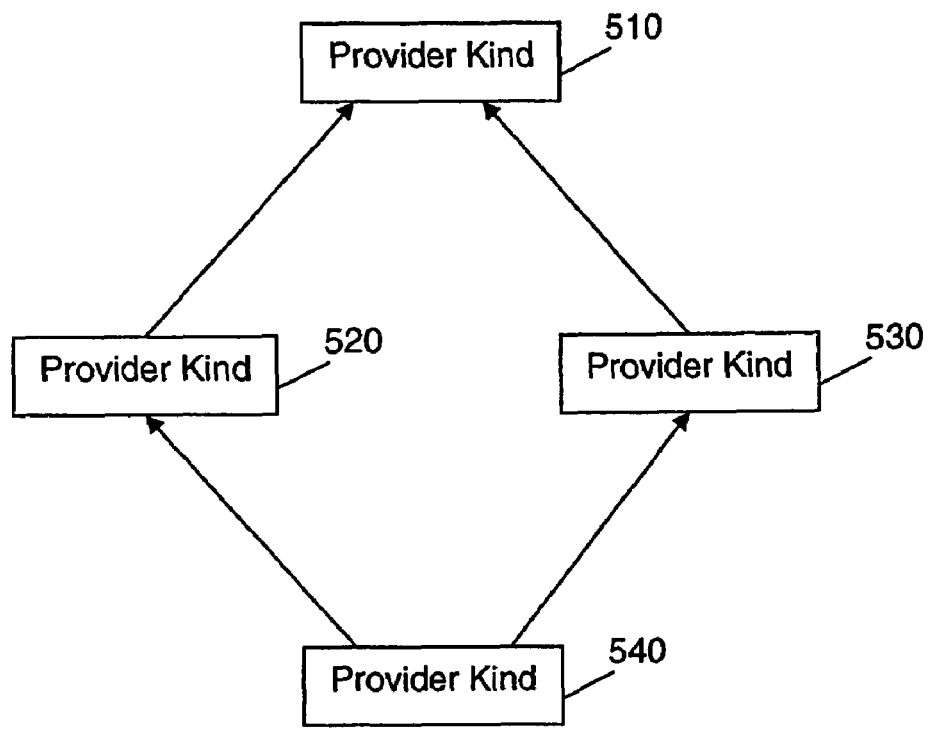
FIG. 5 is a diagram illustrating organization of provider kinds into a hierarchy of subkinds and superkinds, according to an embodiment of the present invention.

FIG. 5 illustrates provider kinds 510, 520, 530, and 540 organized into a hierarchy such that provider kind 510 is the direct parent of provider kinds 520 and 530, which, in turn, are direct parents of provider kind 540. The subkinds of provider kind 510 are provider kinds 510, 520, 530, and 540. The subkinds of provider kind 520 are provider kind 520 and provider kind 540. The subkinds of provider kind 530 are provider kind 530 and provider kind 540. The only subkind of provider kind 540 is provider kind 540, itself. If a provider kind s is a subkind of a provider kind k, a descriptor for a provider of kind s includes at least the attributes found in a provider of kind k.

Figure 6:
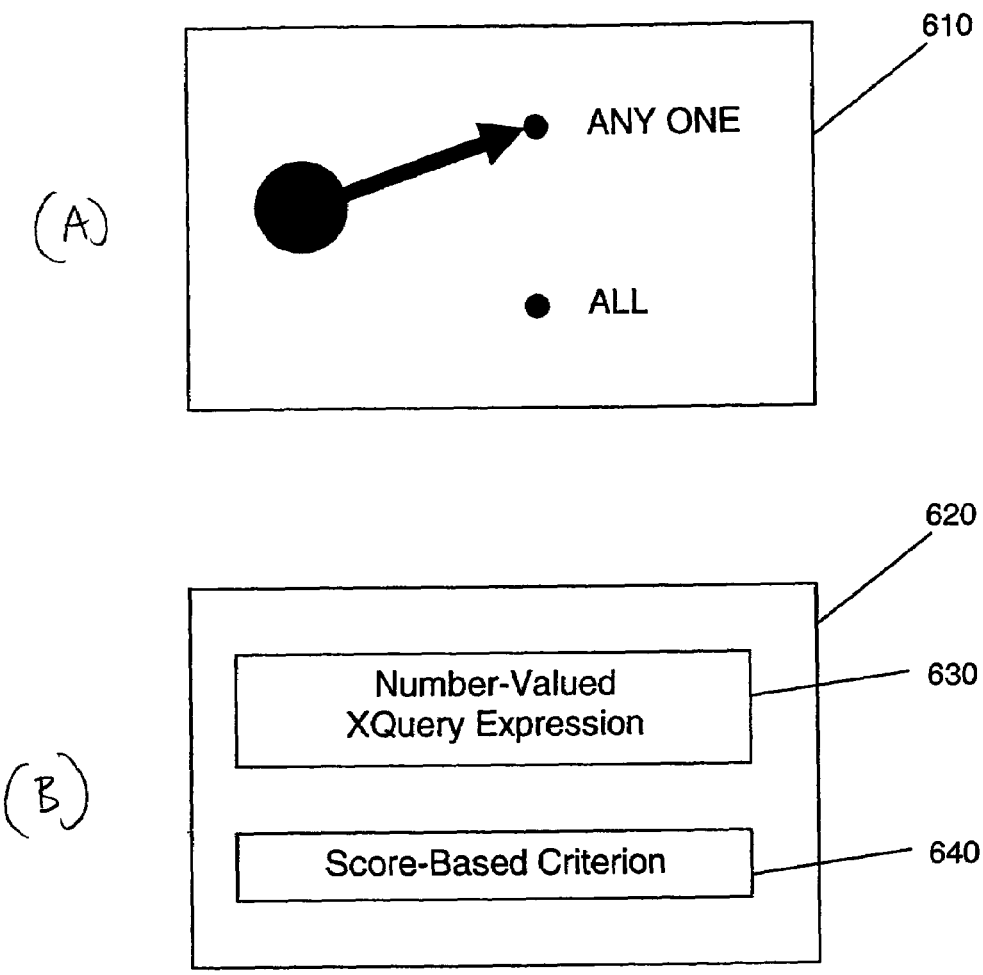
FIGS. 6A and 6B are diagrams illustrating selection mechanisms, according to embodiments of the present invention.

A selection mechanism selects a subset of a set of provider descriptors for data providers eligible to match a query. FIG. 6 respectively illustrate two embodiments of a selection mechanism.

In one embodiment (FIG. 6A), the selection mechanism includes an indication 610 either that all eligible data providers are to be selected or that one arbitrarily chosen data provider is to be selected.

In another embodiment (FIG. 6B), the selection mechanism 620 includes an integer-valued XQuery expression 630 and a score-based criterion 640 for selecting from eligible data providers based on the value of the XQuery expression 630 when applied to the descriptor of each eligible data provider. Possible score-based criteria include, but are not limited to, selecting all data providers with scores above a given threshold, selecting the n data providers with the highest scores for some specified value of n, selecting the first n data providers found regardless of their scores for some specified value of n, and selecting all data providers found within a given time interval regardless of their scores.

Figure 7:
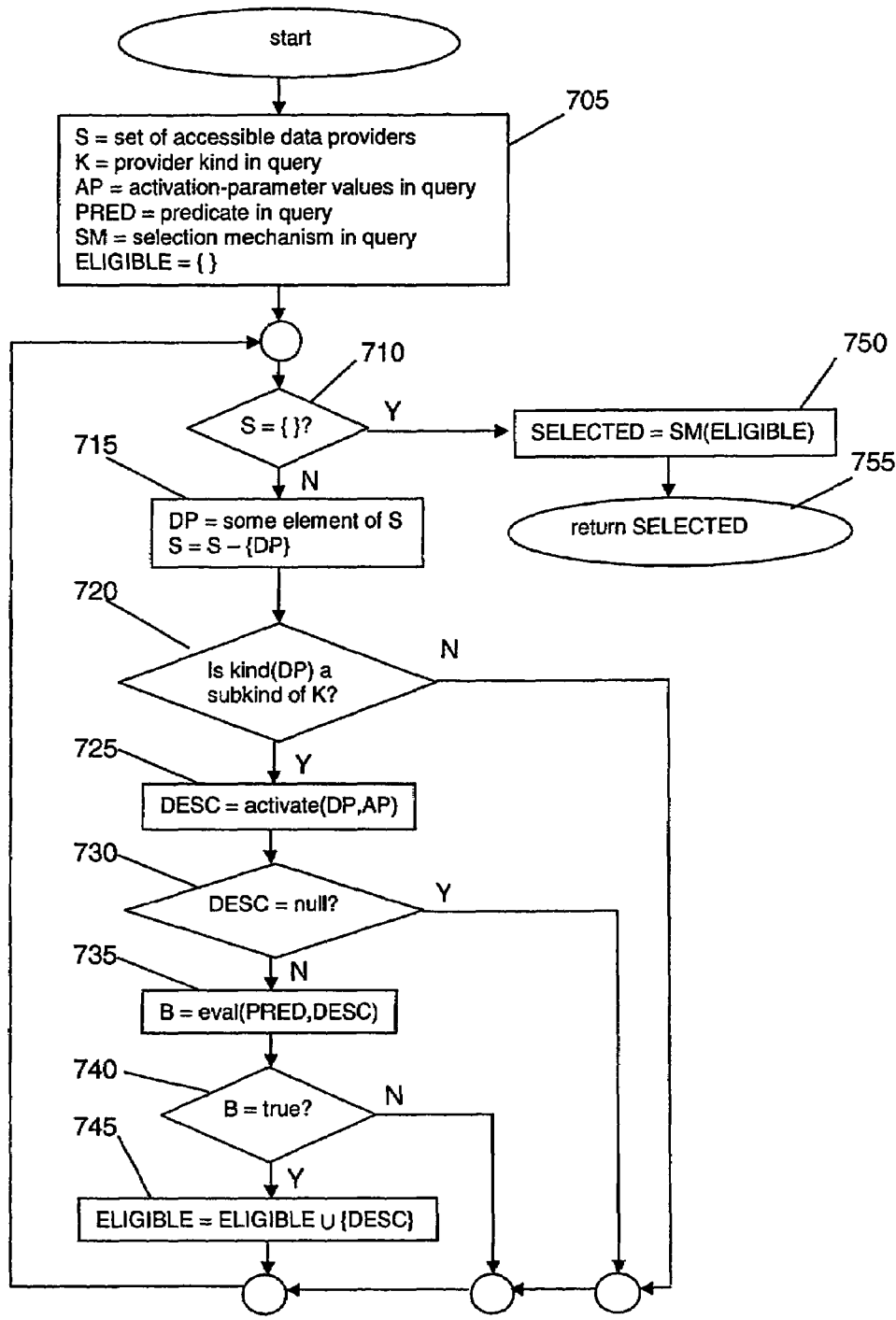
FIG. 7 is a flow diagram illustrating a process by which a query resolution system may process a provider query containing a provider-kind name, according to an embodiment of the present invention.

Given a provider query, a query resolver (110 in FIG. 1) returns a set of matching provider descriptors obtained by following the steps illustrated in the flowchart of FIG. 7. An initialization step 705 sets S to the set of data providers accessible to the query resolver, K to the provider kind specified in the provider query, AP to the activation-parameter values specified in the provider query, PRED to the predicate specified in the provider query, SM to the selection mechanism specified in the provider query, and ELIGIBLE to the empty set.

The query resolver then enters a loop beginning with step 710. Step 710 tests whether S is empty. If so, the query resolver exits the loop and continues with step 750; if not, the query resolver executes step 715. Step 715 selects an arbitrary data provider DP from set S and removes it from S. Then, step 720 tests whether the provider kind of DP is a subkind of K (possibly K itself). If so, execution continues with step 725; if not, execution continues with step 710 for a new iteration of the loop.

Step 725 attempts to activate DP using the activation-parameter values AP, obtaining a provider descriptor DESC, and step 730 tests whether this attempt was successful (in which case DESC has a normull value). If so, execution continues with step 735; if not, execution continues with step 710 for a new iteration of the loop. Step 735 applies predicate PRED to DESC, obtaining a boolean value B. Then, step 740 tests whether B is true. If so, execution continues with step 745; if not, execution continues with step 710 for a new iteration of the loop. Step 745 adds DESC to the set ELIGIBLE, and execution continues with step 710 for a new iteration of the loop.

Following execution of the loop, step 750 applies selection mechanism SM to ELIGIBLE, obtaining a set SELECTED. Then, step 755 returns the set SELECTED. It will be clear to one skilled in the art that there are numerous ways in which this process can be varied to improve its performance. These ways include, but are not limited to, using a database or hash table to retrieve all accessible data providers of the appropriate provider kind, rather than iterating over all data providers and testing the provider kind of each; and creating a partially filled in data-provider descriptor without actually activating the corresponding data provider if all the attribute values referred to by the boolean-valued XQuery expression can be determined without activating the data provider.

Another embodiment, based on pattern matching, increases the number of matches returned by a query processor by enlarging the number of data providers accessible to the query processor. In the pattern-matching embodiment, a new data provider can be constructed that provides values obtained by applying a stream transformation to the stream of values provided by one or more other data providers.

Figure 8:
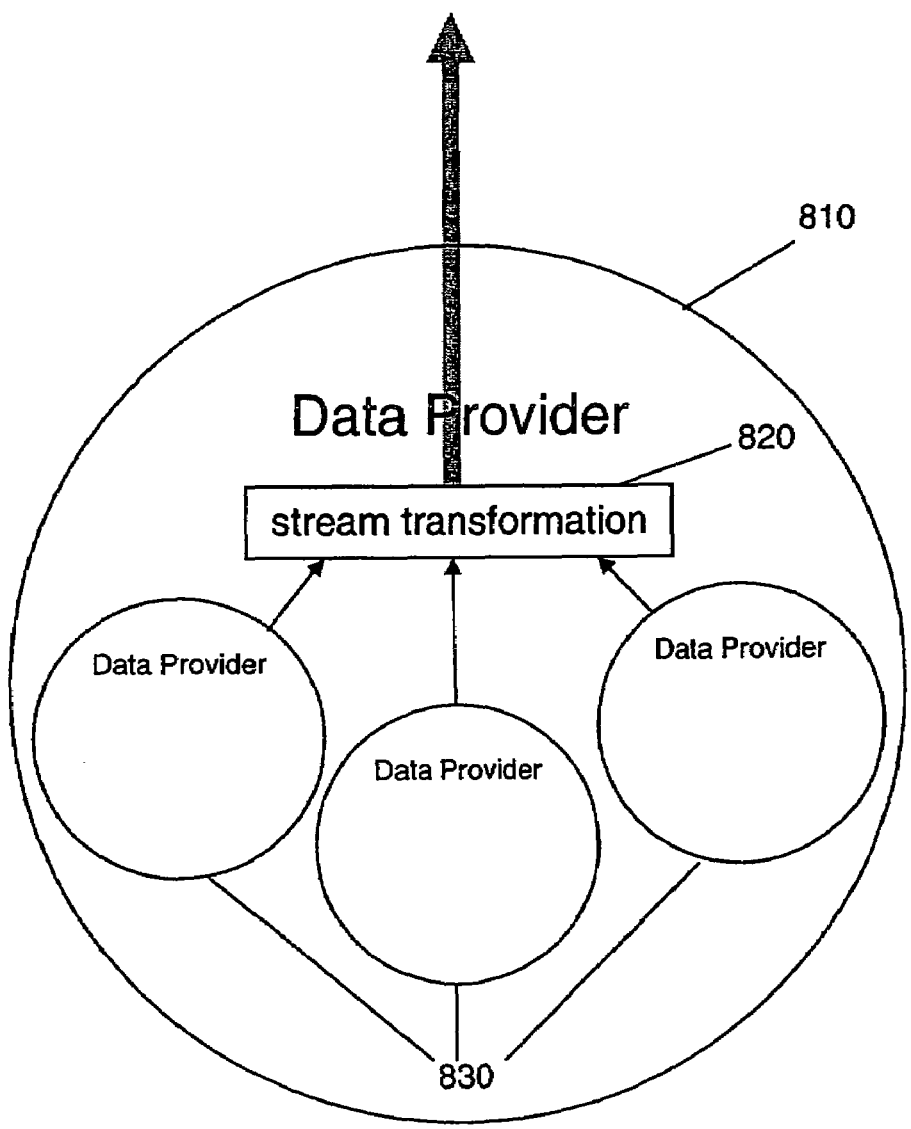
FIG. 8 is a diagram illustrating a data provider constructed by applying a stream transformation to streams of values provided by other data providers, according to an embodiment of the present invention.

FIG. 8 depicts a data provider 810 that applies a stream transformation 820 to other data providers 830. An example of a stream transformation is one that multiplies each value in an incoming data stream of distances in inches by 2.54, obtaining a data stream of distances in centimeters. If this stream transformation is applied to the output of a data provider that provides cumulative rainfall amounts in inches, the constructed data provider is one that provides cumulative rainfall amounts in centimeters. If the same stream transformation is applied to a data provider that provides diameters of blood vessels in inches, the constructed provider is one that provides diameters of blood vessels in centimeters.

Stream transformers can be classified as value-based or stream-based. A value-based stream transformer generates one output value for each input value (or each set of contemporaneous input values, one from each of several input streams). The output value is determined by the input value (or values). A stream-based stream transformer generates output values based on the history of input values up to a certain point and the passage of time. The stream-based stream transformer might not generate an output value for each input value, and might generate output values that do not correspond to any input value.

Value-based transformations include, but are not limited to, the conversion of a value from one representation to another; the extraction of a subset of the components of a composite value; the use of an input value as an index to locate some corresponding value using a mechanism such as a database, a special-purpose file, or a web service; and the use of a formula to derive an output value from an input value or from a set of contemporaneous input values obtained from multiple streams.

Stream-based transformations include, but are not limited to, the generation of values at regularly spaced times based on the most recent input value at each of those times; the computation of an output value as a sum, average, maximum, or minimum of input values received so far, using either all input values received so far, the most recent n values, or all values received in the last t units of time; the matching of patterns of input-value sequences, and the generation of an output value each time such a pattern is matched; the generation as an output value of each input value satisfying a certain criterion; and the generation as an output value of any value found in any input stream.

The provider-kind name 310 of the provider descriptor depicted in FIG. 3 is replaced in the pattern-matching embodiment by a provider-kind definition with components defining the semantics of the provided data. Illustrative examples of such components are dimensions of the provided data, such as mass, length, time, location, or personal identity; units of the provided data, such as kilograms, inches, milliseconds, and degrees; encoding of the provided data, such as IEEE single-precision floating-point representation, ASCII decimal representation, and binary 64-bit integer representation, and 9-digit Social Security number; and semantic significance, such as that the amount of time provided by a data provider of the defined provider kind is the age of the person identified by the activation parameter named "SSN", or that the stream of velocity values provided by a data provider of the defined provider kind is the velocity of an automobile with the vehicle identification number given by the activation parameter named "VIN".

Dimension, units, encoding, and semantic significance can all be represented by character strings with well-understood meanings. The invention supports the incorporation in provider-kind definitions of other kinds of components, also representable by character strings, defining the semantics of the provided data. The invention also supports the use of representations other than character strings.

Figure 9:
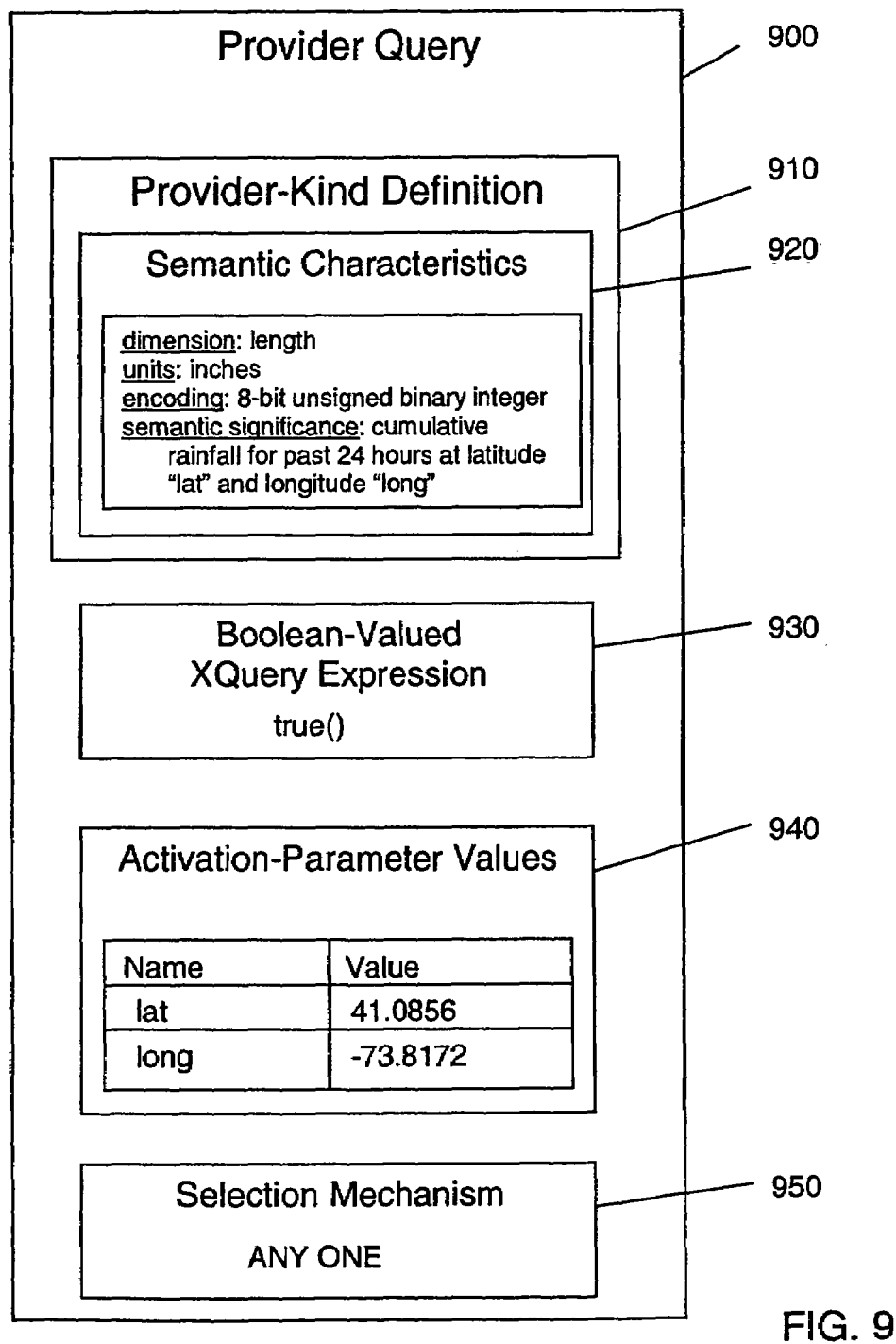
FIG. 9 is a diagram illustrating a provider query containing a provider-kind definition, according to an embodiment of the present invention.

FIG. 9 illustrates a provider query 900 for a source of cumulative rainfall in inches at latitude 41.0856° N and longitude 73.8172° W that includes a provider-kind definition 910 for a provider kind whose data providers provide the cumulative rainfall in inches measured at a specified latitude and longitude. The provider-kind definition includes a set 920 of components defining the semantics of the provided data. Besides the provider-kind definition, the provider query includes a boolean-valued XQuery expression 930, an assignment 940 of values to activation parameters "lat" and "long," and a selection mechanism 950.

A provider-kind template is a provider-kind definition in which certain character strings, and the set of activation parameters, have been replaced by symbols called template parameters. Replacing each occurrence of a template parameter with a value, such that all occurrences of the same template parameter are replaced by the same value, results in a provider-kind definition which is called an instance of the template. If an instance can be obtained from a template with template parameters $p_1, \ldots, p_n$ by replacing all occurrences of $p_i$ with value $v_i$, $1 \leq i \leq n$, we say that the instance matches the template with substitution $[p_1 \rightarrow v_1, \ldots, p_n \rightarrow v_n]$.

Figure 10:
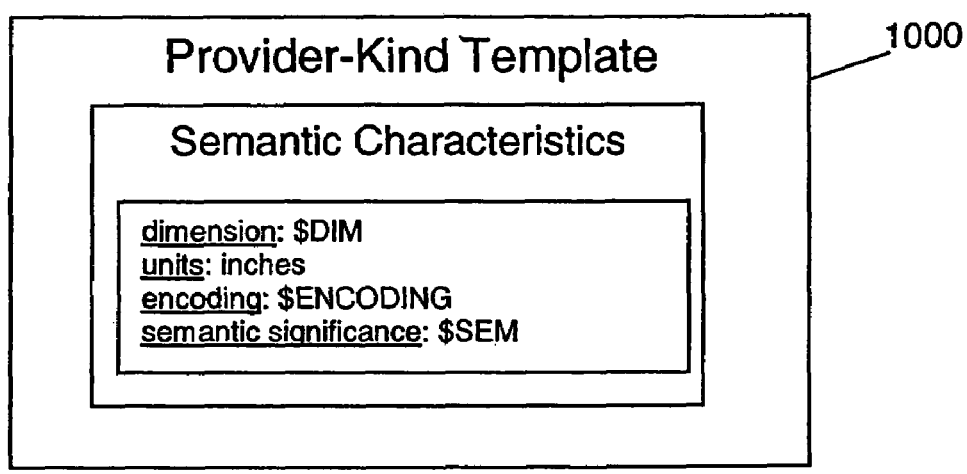
FIG. 10 is a diagram illustrating a provider-kind template, according to an embodiment of the present invention.

FIG. 10 shows an illustrative provider-kind template 1000 with template parameters "$DIM," "$ENCODING," and "$SEM." Provider-kind definition 910 of FIG. 9 matches this template with substitution [$DIM→"length", $ENCODING→"8-bit unsigned binary integer", $SEM→"cumulative rainfall for past 24 hours at latitude 'lat' and longitude 'long'"].

The query resolver has available to it a set of synthesis rules, each including an output provider-kind template, the name of a stream transformation, and one input provider-kind template for each data provider used as an input to the stream transformation. Every template parameter that occurs in an input provider-kind template must also occur in the output provider-kind template, and a given template parameter may occur in multiple input provider-kind templates.

Consider a synthesis rule SR with output provider-kind template OPK_TEMPLATE, stream transformation ST, and input provider-kind templates IPK_TEMPLATE$_1$, . . . IPK_TEMPLATE$_n$. Synthesis rule SR asserts the following. Suppose each occurrence of a template parameter in the parameter-kind templates OPK_TEMPLATE and IPK_TEMPLATE$_1$, . . . IPK_TEMPLATE$_n$ of rule SR is replaced with a value, such that all occurrences of the same template parameter are replaced in all templates of the rule by the same value, obtaining provider-kind definitions OPK_INSTANCE and IPK_INSTANCE$_1$, . . . IPK_INSTANCE$_n$, respectively. Then, the application of stream transformation ST to data providers whose provider kinds are defined by IPK_INSTANCE$_1$, . . . IPK_INSTANCE$_n$ is a data provider whose provider kind is defined by OPK_INSTANCE.

Figure 11:
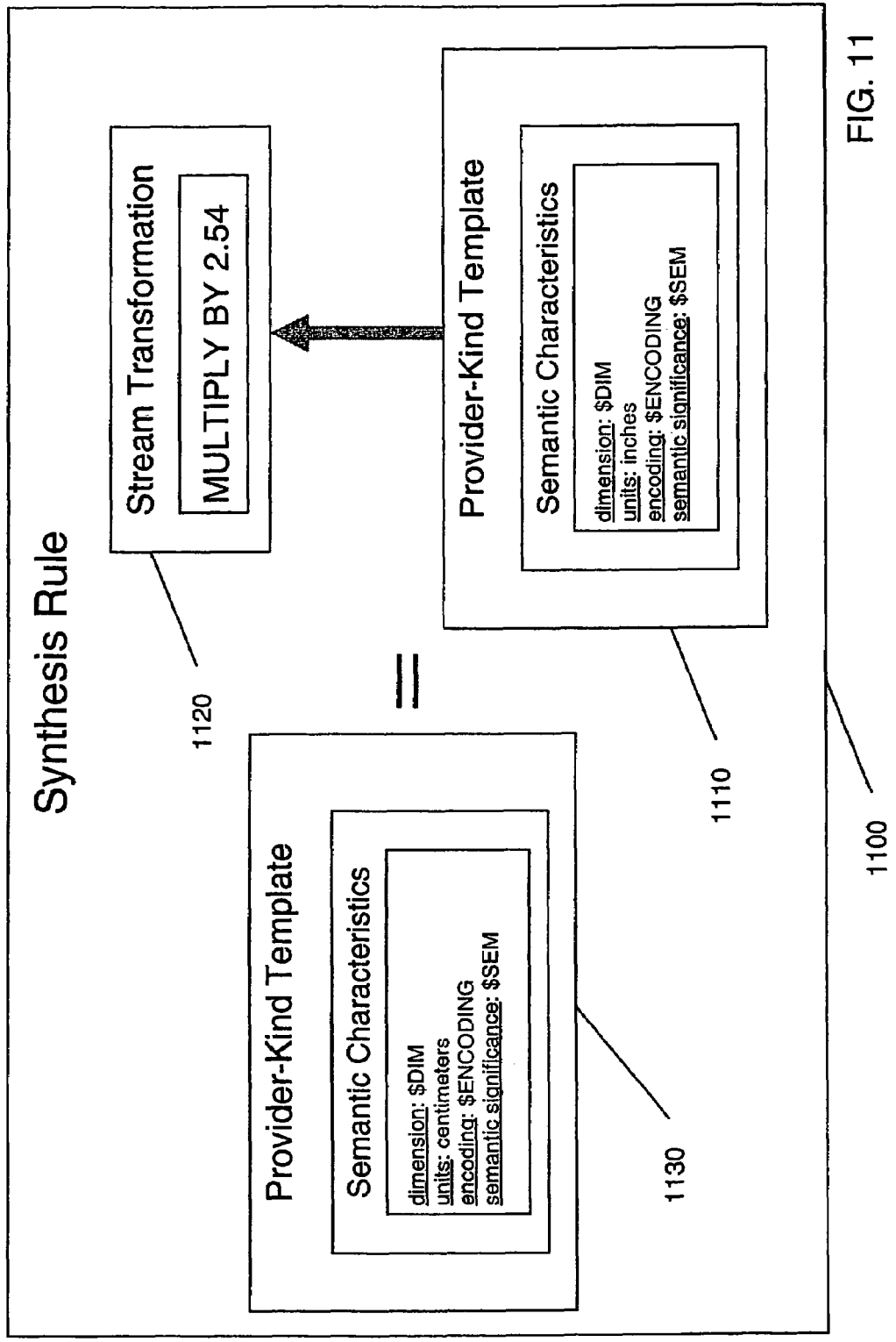
FIG. 11 is a diagram illustrating a synthesis rule, according to an embodiment of the present invention.

FIG. 11 illustrates a synthesis rule 1100 including an input provider-kind template 1110, a stream-transformation name 1120, and an output provider-kind template 1130. The rule asserts that a data provider measuring some quantity in centimeters can be constructed by feeding the output of a data provider measuring that same quantity in inches to the stream transformation "MULTIPLY BY 2.54."

Figure 12:
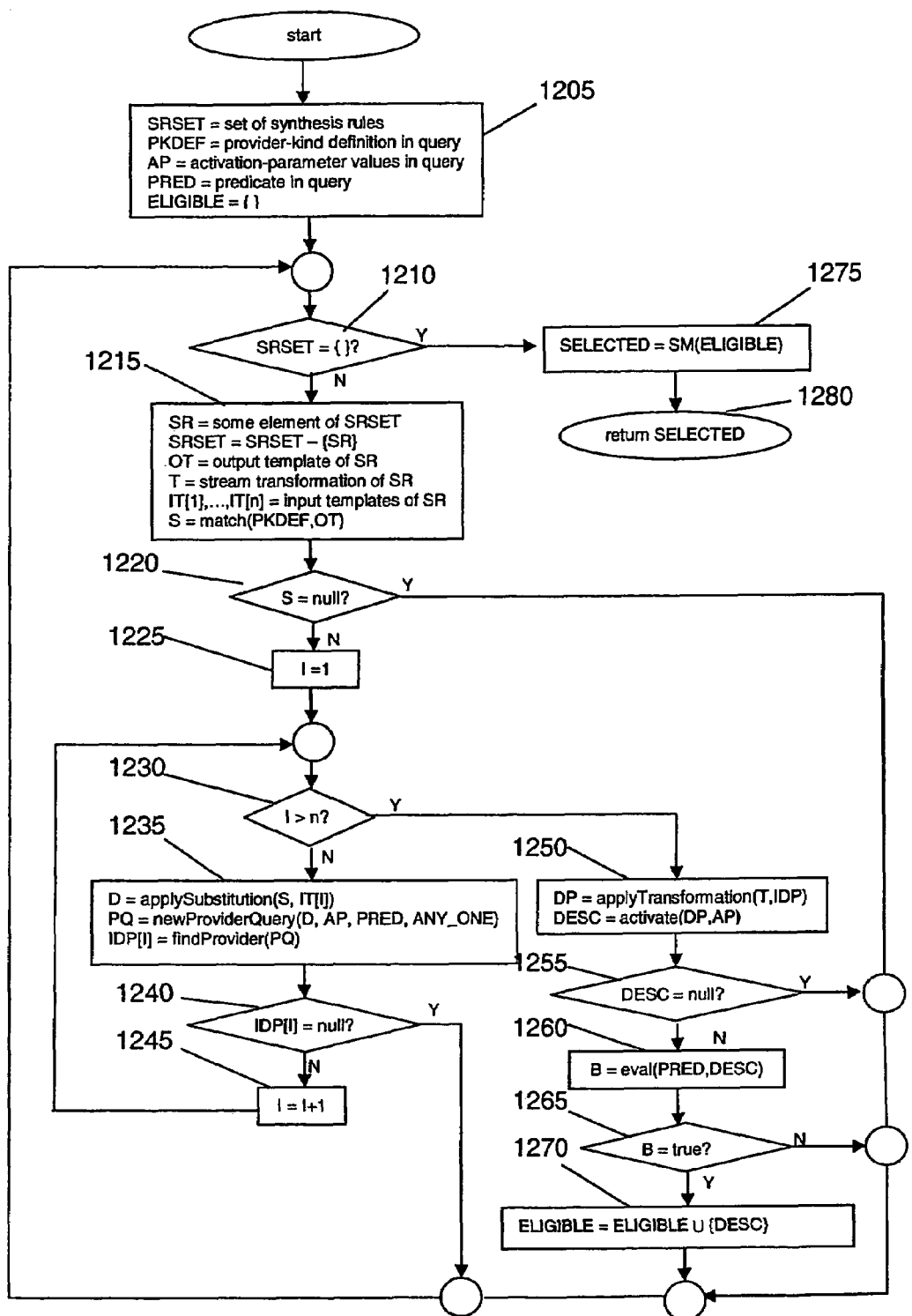
FIG. 12 is a flow diagram illustrating a process by which a query resolution system may process a provider query containing a provider-kind definition, according to an embodiment of the present invention.

Given a provider query, a query resolver returns a set of matching provider descriptors obtained by following the steps illustrated in the flowchart of FIG. 12. An initialization step 1205 sets SRSET to the set of synthesis rules known to the query resolver, sets PKDEF to the provider-kind definition in the provider query, sets AP to the set of activation-parameter values in the query, sets PRED to the boolean-valued XQuery expression in the query, and sets ELIGIBLE to the empty set. The query resolver then enters an outer loop including steps 1210, 1215, 1220, and 1225, an inner loop, and steps 1250, 1255, 1260, 1265, and 1270. The inner loop includes steps 1230, 1235, 1240, and 1245.

An iteration of the outer loop starts with a step 1210 that tests whether SRSET is empty and exits the outer loop if it is empty. Step 1215 selects an arbitrary synthesis rule SR from SRSET, removes the synthesis rule from SRSET, sets OT to the output template of the synthesis rule, sets T to the stream transformation of the synthesis rule, sets the elements of an array IT to the n input templates of the synthesis rule, and determines whether the provider-kind definition PKDEF matches the template OT with some substitution S. If not (i.e., if S is null), step 1220 skips to the end of the iteration of the outer loop. Step 1225 initializes the loop counter I for the inner loop to 1. The query resolver then proceeds to the inner loop.

An iteration of the inner loop begins with a step 1230 that tests whether the loop counter I exceeds the number of input templates n, and exits the inner loop if so. Step 1235 obtains a provider-kind definition D by applying substitution S to input provider-kind template IT[I]; creates a new provider query PQ containing provider-kind definition D, activation-parameter values AP, boolean-valued XQuery expression PRED, and selection mechanism "ANY ONE"; recursively invokes the steps of FIG. 12 to attempt to find a data provider satisfying PQ, and assigns the result to IDP[I]. Step 1240 tests whether the attempt to find a data provider satisfying PQ was successful (i.e., whether IDP[I] is normull); if not, the query resolver exits from the inner loop and skips to the end of the current iteration of the outer loop. Step 1245 completes the iteration of the inner loop by incrementing the loop counter I in preparation for the next iteration of the inner loop.

Following completion of the inner loop, step 1250 constructs a new data provider DP by applying the stream transformation T to data providers IDP[1], . . . ,IDP[n] and attempts to activate DP with activation-parameter values AP, obtaining a provider descriptor DESC. Step 1255 tests whether the activation attempt was successful (i.e., whether DESC is normull); if not, the query resolver skips to the end of the iteration of the outer loop. Step 1260 evaluates the boolean-valued XQuery expression PRED in the context of the provider descriptor DESC and step 1265 tests whether the result is true, skipping to the end of the iteration of the outer loop if it is not. Step 1270 adds DESC to the set ELIGIBLE, ending the iteration of the outer loop. Following execution of the outer loop, step 1275 applies selection mechanism SM to ELIGIBLE, obtaining a set SELECTED. Then step 1280 returns the set SELECTED.

Figure 13:
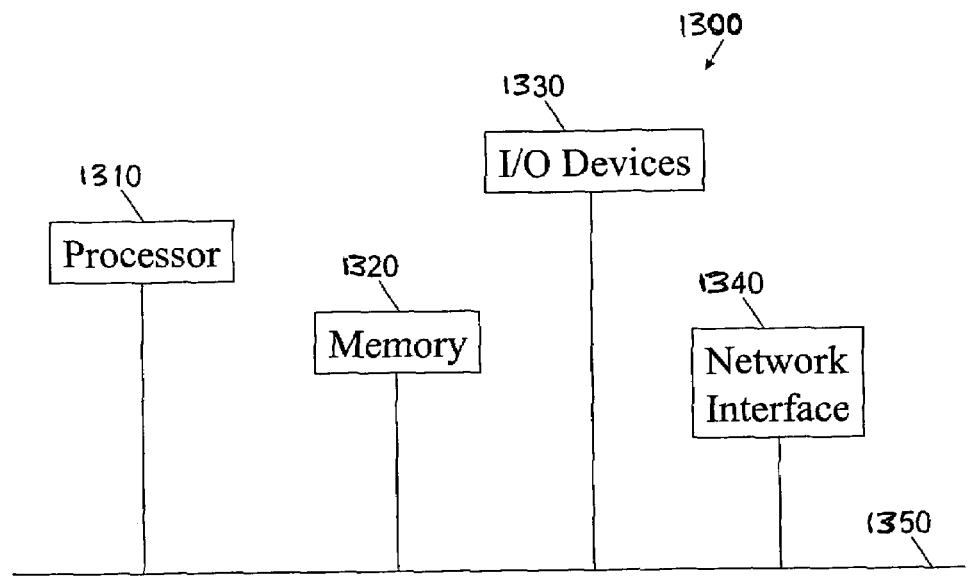
FIG. 13 is a block diagram illustrating a computer system suitable for implementing a query resolution system, according to an embodiment of the present invention.

Referring lastly to FIG. 13, a computer system suitable for implementing a query resolution system, according to an exemplary embodiment of the present invention, is illustrated. For example, the illustrative architecture of FIG. 13 may be used in implementing any and all of the components and/or steps described in the context of FIGS. 1 through 12.

As shown, the computer system 1300 may be implemented in accordance with a processor 1310, a memory 1320, I/O devices 1330, and a network interface 1340, coupled via a computer bus 1350 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

It is to be further appreciated that the present invention also includes techniques for providing descriptive query services. By way of example, a service provider agrees (e.g., via a service level agreement or some informal agreement or arrangement) with a service customer or client to provide descriptive query services. That is, by way of one example only, the service provider may host the customer's web site and associated applications. Then, in accordance with terms of the contract between the service provider and the service customer, the service provider provides descriptive query services that may include one or more of the methodologies of the invention described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of processing descriptive queries for data sources, comprising the steps of:

given a set of named data providers, each distinguished by a type of data the data provider provides and a set of attributes each with a unique name and a particular type of value, and a grouping of the data providers into named provider kinds, such that data providers grouped into the same provider kind provide the same type of data and have the same set of attributes;

obtaining a descriptive query, the descriptive query comprising the name of a provider kind and a specification of a mapping from an assignment of one or more values for one or more attributes of the data provider to one of a true value and a false value; and resolving the descriptive query, the resolving step comprising obtaining the names of data providers in the set of named data providers that belong to the provider kind specified in the descriptive query and for which the mapping specified in the descriptive query maps the one or more values of the one or more attributes of the data provider to the true value;

wherein the mapping specification comprises a boolean-valued expression in which the names of the attributes of a data provider appear, representing the assigned values of the attributes;

wherein the boolean-valued expression is an XQuery expression evaluated in the context of an XML document that specifies the values of the attributes of the data provider;

wherein each data provider has a set of uniquely named activation parameters, each of a specified type;

wherein data providers grouped into the same provider kind have activation parameters with the same set of names, with identically named activation parameters of different data providers of the same provider kind having the same type, and wherein the descriptive query includes an assignment of values to activation parameters, with the value assigned to an activation parameter being of the type of that activation parameter, and wherein the resolving step further comprises obtaining the names of data providers in the set of named data providers, activated with the assignment of activation parameter values in the descriptive query, that belong to the provider kind specified in the descriptive query and for which the mapping specified in the descriptive query mares the values of the attributes of the data provider to the true value;

wherein the descriptive query further comprises the specification of a selection mechanism for selecting a subset of a set of data providers; and wherein the resolving step further comprises obtaining the names of data providers in the subset selected by the selection mechanism specified in the descriptive query from the set of data providers in the set of named data providers that belong to the provider kind specified in the descriptive query and for which the mapping specified in the descriptive query mares the values of the attributes of the data provider to the true value.

2. The method of claim 1, wherein the selection mechanism selects one arbitrary member of the set of data providers or all members of the set of data providers.

3. The method of claim 1, wherein the specification of a selection mechanism comprises the specification of a mapping from an assignment of values for attributes of a data provider to a numeric value and the specification of a mechanism for selecting a subset of a set of data providers given the numeric value to which the mapping maps the attribute values of each data provider in the set.

4. The method of claim 3, wherein the specification of a mapping from an assignment of values for attributes of a data provider to a numeric value comprises a number-valued expression in which the names of the attributes of a data provider appear, representing the assigned values of the attributes.

5. The method of claim 4, wherein the number-valued expression is an XQuery expression evaluated in the context of an XML document that specifies the values of the attributes of the data provider.

6. The method of claim 3, wherein the specification of a mechanism for selecting a subset of a set of data providers given the numeric value comprises selecting all data providers with numeric values above a given threshold.

7. The method of claim 3, wherein the specification of a mechanism for selecting a subset of a set of data providers given the numeric value comprises selecting the N data providers with the highest numeric values for a specified value of N.

8. The method of claim 3, wherein the specification of a mechanism for selecting a subset of a set of data providers given the numeric value comprises selecting the first N data providers found regardless of their numeric values for a specified value of N.

9. The method of claim 3, wherein the specification of a mechanism for selecting a subset of a set of data providers given the numeric value comprises selecting all data providers found within a time interval T regardless of their numeric values.

10. The method of claim 1, wherein a first provider kind is designated as a subkind of a second provider kind if the type of the data provided by the first provider kind is a subtype of the type of the data provided by the second provider kind, and wherein the resolving step alternatively obtains the names of data providers in the set of named data providers that belong to the provider kind specified in the descriptive query, or to any subkind of the provider kind, and for which the mapping specified in the descriptive query maps the values of the attributes of the data provider to the true value.

11. The method of claim 1, wherein a first provider kind is designated as a subkind of a second provider kind if:

the type of the data provided by the first provider kind is a subtype of the type of the data provided by the second provider kind;

the set of activation-parameter names of the first provider kind is a subset of the set of activation parameter names of the second provider kind; and the type of each activation parameter of the first provider kind is a supertype of the type of the identically named activation parameter of the second kind;

wherein the resolving step alternatively obtains the names of data providers in the set of named data providers that belong to the provider kind specified in the descriptive query, or to any subkind of the provider kind, and for which the mapping specified in the descriptive query maps the values of the attributes of the data provider to the true value.

12. The method of claim 1, wherein at least one data provider comprises the application of a stream transformer to a stream of data provided by one or more other data providers.

13. The method of claim 12, further comprising:

providing a set of templates for the specification of provider kinds, in which one or more entities are replaced by one or more template-parameter symbols, wherein substitution of template-parameter values for the template-parameter symbols in a template results in an instance of the template, uniquely specifying a provider kind;

providing a set of synthesis rules, each asserting that an instance of a specified template is synthesized by applying a specified stream transformer to the stream of data provided by the instances of one or more specified templates, provided that the instances are obtained by replacing all occurrences a given template-parameter symbol in the rule with the same template-parameter value;

wherein the resolving step alternatively obtains the names of data providers, either belonging to the set of named data providers or synthesized in accordance with the set of synthesis rules, that belong to the provider kind specified in the descriptive query and for which the mapping specified in the descriptive query maps the values of the attributes of the data provider to the true value.

14. Apparatus for processing descriptive queries for data sources, comprising:

a memory; and at least one processor coupled to the memory and operative to, given a set of named data providers, each distinguished by a type of data the data provider provides and a set of attributes each with a unique name and a particular type of value, and a grouping of the data providers into named provider kinds, such that data providers grouped into the same provider kind provide the same type of data and have the same set of attributes: (i) obtain a descriptive query, the descriptive query comprising the name of a provider kind and a specification of a mapping from an assignment of one or more values for one or more attributes of the data provider to one of a true value and a false value; and (ii) resolve the descriptive query, the resolving step comprising obtaining the names of data providers in the set of named data providers that belong to the provider kind specified in the descriptive query and for which the mapping specified in the descriptive query maps the one or more values of the one or more attributes of the data provider to the true value;

wherein the mapping specification comprises a boolean-valued expression in which the names of the attributes of a data provider appear, representing the assigned values of the attributes;

wherein the boolean-valued expression is an XQuery expression evaluated in the context of an XML document that specifies the values of the attributes of the data provider;

wherein each data provider has a set of uniquely named activation parameters, each of a specified type;

wherein data providers grouped into the same provider kind have activation parameters with the same set of names, with identically named activation parameters of different data providers of the same provider kind having the same type, and wherein the descriptive query includes an assignment of values to activation parameters, with the value assigned to an activation parameter being of the type of that activation parameter, and wherein the resolving step further comprises obtaining the names of data providers in the set of named data providers, activated with the assignment of activation parameter values in the descriptive query, that belong to the provider kind specified in the descriptive query and for which the mapping specified in the descriptive query mares the values of the attributes of the data provider to the true value;

wherein the descriptive query further comprises the specification of a selection mechanism for selecting a subset of a set of data providers; and wherein the resolving step further comprises obtaining the names of data providers in the subset selected by the selection mechanism specified in the descriptive query from the set of data providers in the set of named data providers that belong to the provider kind specified in the descriptive query and for which the mapping specified in the descriptive query mares the values of the attributes of the data provider to the true value.

15. An article of manufacture for processing descriptive queries for data sources, comprising a machine readable medium containing one or more programs which when executed implement the steps of:

given a set of named data providers, each distinguished by a type of data the data provider provides and a set of attributes each with a unique name and a particular type of value, and a grouping of the data providers into named provider kinds, such that data providers grouped into the same provider kind provide the same type of data and have the same set of attributes;

obtaining a descriptive query, the descriptive query comprising the name of a provider kind and a specification of a mapping from an assignment of one or more values for one or more attributes of the data provider to one of a true value and a false value; and resolving the descriptive query, the resolving step comprising obtaining the names of data providers in the set of named data providers that belong to the provider kind specified in the descriptive query and for which the mapping specified in the descriptive query maps the one or more values of the one or more attributes of the data provider to the true value;

wherein the mapping specification comprises a boolean-valued expression in which the names of the attributes of a data provider appear, representing the assigned values of the attributes;

wherein the boolean-valued expression is an XQuery expression evaluated in the context of an XML document that specifies the values of the attributes of the data provider;

wherein each data provider has a set of uniquely named activation parameters, each of a specified type;

wherein data providers grouped into the same provider kind have activation parameters with the same set of names, with identically named activation parameters of different data providers of the same provider kind having the same type, and wherein the descriptive query includes an assignment of values to activation parameters, with the value assigned to an activation parameter being of the type of that activation parameter, and wherein the resolving step further comprises obtaining the names of data providers in the set of named data providers, activated with the assignment of activation parameter values in the descriptive query, that belong to the provider kind specified in the descriptive query and for which the mapping specified in the descriptive query mares the values of the attributes of the data provider to the true value;

wherein the descriptive query further comprises the specification of a selection mechanism for selecting a subset of a set of data providers; and wherein the resolving step further comprises obtaining the names of data providers in the subset selected by the selection mechanism specified in the descriptive query from the set of data providers in the set of named data providers that belong to the provider kind specified in the descriptive query and for which the mapping specified in the descriptive query mares the values of the attributes of the data provider to the true value.

16. The apparatus of claim 14, wherein the selection mechanism selects one arbitrary member of the set of data providers or all members of the set of data providers.

17. The apparatus of claim 14, wherein the specification of a selection mechanism comprises the specification of a mapping from an assignment of values for attributes of a data provider to a numeric value and the specification of a mechanism for selecting a subset of a set of data providers given the numeric value to which the mapping maps the attribute values of each data provider in the set.

18. The apparatus of claim 17, wherein the specification of a mapping from an assignment of values for attributes of a data provider to a numeric value comprises a number-valued expression in which the names of the attributes of a data provider appear, representing the assigned values of the attributes.

19. The article of manufacture of claim 15, wherein the selection mechanism selects one arbitrary member of the set of data providers or all members of the set of data providers.

20. The article of manufacture of claim 15, wherein the specification of a selection mechanism comprises the specification of a mapping from an assignment of values for attributes of a data provider to a numeric value and the specification of a mechanism for selecting a subset of a set of data providers given the numeric value to which the mapping maps the attribute values of each data provider in the set.

21. The article of manufacture of claim 20, wherein the specification of a mapping from an assignment of values for attributes of a data provider to a numeric value comprises a number-valued expression in which the names of the attributes of a data provider appear, representing the assigned values of the attributes.

22. The article of manufacture of claim 21, wherein the number-valued expression is an XQuery expression evaluated in the context of an XML document that specifies the values of the attributes of the data provider.

* * * * *